US012027055B1

(12) United States Patent
Zhu et al.

(10) Patent No.: US 12,027,055 B1
(45) Date of Patent: Jul. 2, 2024

(54) UNMANNED AERIAL VEHICLE ASSISTED TASK OFFLOADING AND RESOURCE ALLOCATION METHOD BASED ON SERVICE CACHING

(71) Applicant: NANJING UNIVERSITY OF POSTS AND TELECOMMUNICATIONS, Nanjing (CN)

(72) Inventors: Qi Zhu, Nanjing (CN); Qian Cheng, Nanjing (CN)

( * ) Notice: Subject to any disclaimer, the term of this patent is extended or adjusted under 35 U.S.C. 154(b) by 0 days.

(21) Appl. No.: 18/539,186

(22) Filed: Dec. 13, 2023

Related U.S. Application Data

(63) Continuation of application No. PCT/CN2023/120756, filed on Sep. 22, 2023.

(30) Foreign Application Priority Data

Apr. 21, 2023 (CN) ........................ 202310433665.0

(51) Int. Cl.
*G08G 5/00* (2006.01)

(52) U.S. Cl.
CPC ......... *G08G 5/0026* (2013.01); *G08G 5/0013* (2013.01)

(58) Field of Classification Search
CPC ........................... G08G 5/0026; G08G 5/0013
See application file for complete search history.

(56) References Cited

U.S. PATENT DOCUMENTS

2023/0026782 A1 1/2023 Sha et al.

FOREIGN PATENT DOCUMENTS

| | | | | |
|---|---|---|---|---|
| CN | 113378369 | A | | 9/2021 |
| CN | 113873660 | A | | 12/2021 |
| CN | 115174481 | A | | 10/2022 |
| CN | 115659803 | A | * | 1/2023 |
| CN | 115833907 | A | * | 3/2023 |
| CN | 115988543 | A | * | 4/2023 |
| KR | 20210026171 | A | | 3/2021 |

OTHER PUBLICATIONS

English translation of CN 115659803 A (Year: 2023).*
English translation of CN 1158333907 A (Year: 2023).*
English translation of CN 115988543 A (Year: 2023).*
Internation Search Report of PCT/CN2023/120756, Mailed Nov. 2, 2023.

* cited by examiner

*Primary Examiner* — Shon G Foley

(57) ABSTRACT

An unmanned aerial vehicle assisted task offloading and resource allocation method based on service caching is provided. The unmanned aerial vehicles are capable to cache a portion of programs to perform computation tasks for offloading of ground terminal devices, while a local terminal device is capable to cache a small number of programs. Under the constraints of task completion delay requirements for all devices and UAVs, as well as limited energy of UAVs, an optimization problem of minimizing the total time delay of request tasks of all ground terminal devices are established. This problem is a mixed integer nonlinear programming problem, which is decoupled into three sub-problems: task offloading decision, UAV resource allocation, and UAV trajectory. Slack variables, Lagrange multiplier method, and Taylor expansion method are used to iteratively solve the three sub-problems, and the optimal solutions for task offloading decision, UAV resource allocation, and UAV trajectory are obtained.

10 Claims, 2 Drawing Sheets

UNMANNED AERIAL VEHICLE ASSISTED TASK OFFLOADING AND RESOURCE ALLOCATION METHOD BASED ON SERVICE CACHING

CROSS-REFERENCE

This application is a continuation of International Application No. PCT/CN2023/120756 with a filling date of Sep. 22, 2023, designating the United states, now pending, and further claims to the benefit of priority from Chinese Application No. 202310433665.0 with a filing date of Apr. 21, 2022. The content of the aforementioned applications, including any intervening amendments thereto, are incorporated herein by reference.

TECHNICAL FIELD

The present disclosure relates to the field of communication technology, in particular to an unmanned aerial vehicle assisted task offloading and resource allocation method based on service caching.

BACKGROUND

With the development of information technology, many intelligent disclosures are constantly emerging, such as facial recognition, interactive games, and virtual reality. These disclosures usually have the characteristics of computationally intensive and time delay-sensitive. The emergence of mobile edge computing (MEC) provides convenience for the implementation of these computing tasks. In practical disclosures, due to shadow fading and multipath effect, the signal attenuation in ground communication is severe. Therefore, unmanned aerial vehicle (UAV) assisted MEC systems are valued for their flexible maneuverability and low cost. In the mobile edge computing system, the edge service caching refers to the pre-storage of the programs needed to perform computing tasks on the MEC server. When computing tasks are offloaded to the MEC server the server must have corresponding service programs to complete the corresponding computing tasks. Service caching effectively reduces real-time time delay and communication costs for obtaining and initializing service disclosures.

SUMMARY

The objective of the present disclosure is to provide an unmanned aerial vehicle assisted task offloading and resource allocation method based on service caching. This method addresses the competitive interests of users in the collaborative computing process. The unmanned aerial vehicle can cache some programs to perform the computing task of ground terminal devices offloading, while the local ground terminal devices can cache a small number of programs to perform some computing tasks.

To achieve the above function, the present disclosure provides an unmanned aerial vehicle assisted task offloading and resource allocation method based on service caching. Under the constraints of task completion delay requirements for all devices and unmanned aerial vehicles and limited energy of unmanned aerial vehicles, the optimization problem of minimizing the total time delay of request tasks of all ground terminal devices are established. This problem is a mixed integer nonlinear programming problem, which is decoupled into three sub-problems: task offloading decision, UAV resource allocation, and UAV trajectory. Slack variable, Lagrange multiplier method and Taylor expansion method are use to perform iterative solving of the three sub-problems respectively, so that the optimal solutions of task offloading decision, UAV resource allocation and UAV trajectory are obtained.

Technical solution: to solve the above technical problems, the technical solution adopted by the present disclosure is:

In the first aspect, an unmanned aerial vehicle assisted task offloading and resource allocation method based on service caching is provided by the present disclosure, which includes:

S1. obtaining local popularity based on historical required services of ground terminal devices, selective caching required services for unmanned aerial vehicle based on the local popularity to obtain a caching solution of the unmanned aerial vehicles;

S2. applying, by the ground terminal devices, a random caching service to obtain a caching solution of the ground terminal devices;

S3. in response to task requests from the ground terminal devices, based on the caching solution of the unmanned aerial vehicle and the caching solution of the ground terminal devices, utilizing a pre built optimization problem that minimizes a total time delay of request tasks of all ground terminal devices to optimize to obtain a task offloading decision, an unmanned aerial vehicle resource allocation, and an unmanned aerial vehicle trajectory;

S4. determining, according to the optimized task offloading decision, a task requested by the ground terminal devices to perform computation on a local terminal device, or offload the task to the corresponding unmanned aerial vehicle for computation; the unmanned aerial vehicle is flying according to the optimized unmanned aerial vehicle trajectory; and allocating resources to the ground terminal devices based on the optimized unmanned aerial vehicle resource allocation.

In some embodiments, the step S4 includes:

S41. performing computation to the task requested by the ground terminal devices on the local terminal device;

S411. if the required services has been cached in the ground terminal devices, performing task computation directly;

S412. if the ground terminal devices do not cache the required services, but there are services requested by the ground terminal devices cached on the unmanned aerial vehicle, then based on the optimized unmanned aerial vehicle trajectory and the optimized unmanned aerial vehicle resource allocation, downloading the corresponding service program from the unmanned aerial vehicles to the ground terminal devices, and performing computing services on the ground terminal devices directly;

S413. if the ground terminal devices do not cache the required services and the unmanned aerial vehicles do not cache the services requested by the ground terminal devices, using a wireless backhaul link to download the service program from a remote end to the unmanned aerial vehicles through a base station; based on the optimized unmanned aerial vehicle trajectory and the optimized unmanned aerial vehicle resource allocation, downloading the corresponding service program from the unmanned aerial vehicles to the ground terminal devices, and performing computing services on the ground terminal devices directly.

In some embodiments, step S4 includes:

S42. offloading, by the ground terminal devices, tasks to the corresponding unmanned aerial vehicle for computation;

S421. services requested by the ground terminal devices are cached in the unmanned aerial vehicles, performing computation directly on the unmanned aerial vehicles based on the optimized unmanned aerial vehicle trajectory and the optimized unmanned aerial vehicle resource allocation;

S422. if there is no cached services requested by ground terminal devices in the unmanned aerial vehicles, using a wireless backhaul link to download service programs from a remote end to the unmanned aerial vehicles through a base station, and performing computation based on the optimized unmanned aerial vehicle trajectory and the optimized unmanned aerial vehicle resource allocation on the unmanned aerial vehicles.

In some embodiments, step S1 includes:

S11. an access method between the ground terminal devices and the unmanned aerial vehicles adopts a closest distance access, when the ground terminal devices are within a coverage range of the unmanned aerial vehicles, the nearest unmanned aerial vehicle provides services; setting $M_k$ as the number of the ground terminal devices served by the unmanned aerial vehicle k;

S12. a request probability of service s from the ground terminal devices m is $p_{ms}$, and a request probability matrix P for all ground terminal devices are:

$$P=\begin{pmatrix} p_{11} & \cdots & p_{1S} \\ \vdots & \ddots & \vdots \\ p_{M1} & \cdots & p_{MS} \end{pmatrix}$$

S13. obtaining local popularity $p_s^k$ based on the request probability $p_{ms}$ of services from the ground terminal devices m:

$$p_s^k=\frac{\sum_{m\in M_k} p_{ms}}{|M_k|}$$

S14. since there is no coupling of content deployment between the unmanned aerial vehicles, in order to improve a hit ratio of caching services of the unmanned aerial vehicles, service programs with high local popularity are cached in the unmanned aerial vehicles.

In some embodiments, in step S3, a optimization problem P1 of minimizing the total time delay of request tasks of all ground terminal devices includes:

$$P1:\ \min_{B,F,C,Q}\sum_{m=1}^{M} T_m$$

$$\text{s.t. } C1: T_m \le D_m^{max},\ \forall\, m\in M,$$

$$C2: E_m \le E_m^{max},\ \forall\, m\in M,$$

$$C3: E_k \le E_k^{max},\ \forall\, k\in K,$$

$$C4: \sum_{m=1}^{M} f_{k,m} \le F_k^{max},\ \forall\, m\in M,\ \forall\, k\in K,$$

-continued $$C5: c_{m,k} \le b_{m,k},\ \forall\, m\in M,\ \forall\, k\in K,$$

$$C6: \sum_{k=1}^{K} b_{m,k} = 1,\ \forall\, m\in M,\ \forall\, k\in K,$$

$$C7: \sum_{m=1}^{M} b_{m,k} \le N_k^{max},\ \forall\, m\in M,\ \forall\, k\in K,$$

$$C8: \|Q_k - Q_l\|^2 \le d_m^2,\ \forall\, k\in K,\ k\ne l,$$

$$C9: b_{m,k}(R_{k,m}) \le R_k^{max},\ \forall\, m\in M,\ \forall\, k\in K,$$

$$C10: c_{m,k}, a_{k,s}, b_{m,k}, e_{m,s} \in \{0,1\},\ \forall\, m\in M,\ \forall\, k\in K,$$

Wherein, C1 denotes the time delay limit; $T_m$ denotes a total time delay for completing tasks requested by the ground terminal devices m; K={1, 2, . . . , K} and M={1, 2, . . . , M} denote sets of the unmanned aerial vehicles and the ground terminal devices, respectively; $B=(b_{m,k}\in\{0,1\}: m\in M, k\in K)$ denotes a set of whether the ground terminal devices m are accessed to the unmanned aerial vehicles k; $F=(f_{k,m}: m\in M, k\in K)$ denotes a set of computing capabilities of the unmanned aerial vehicles k on the ground terminal devices m; $c=(c_{m,k}\in\{0,1\}: m\in M, k\in K)$ denotes a set of whether the computing tasks of the ground terminal devices m are offloaded to the unmanned aerial vehicles; $Q=(Q_k: k\in K)$ denotes horizontal position coordinates of the unmanned aerial vehicles k; $D_m^{max}$ denotes a maximum time delay of the tasks of the ground terminal devices m, ∀ denotes any mathematical symbol; C2 denotes an user energy consumption limit, $E_m$ denotes total energy consumption of the ground terminal devices m, $E_m^{max}$ denotes maximum energy consumption of the ground terminal devices m; C3 denotes an energy consumption limit of the unmanned aerial vehicles, $E_k$ denotes total energy consumption of the unmanned aerial vehicles k, $E_k^{max}$ denotes maximum energy consumption of the unmanned aerial vehicles; C4 denotes resource limitation allocated to the unmanned aerial vehicles; $f_{k,m}$ denotes computing capabilities of the unmanned aerial vehicles k towards the ground terminal devices m; $F_k^{max}$ denotes the maximum computing capabilities of the unmanned aerial vehicles k; C5 denotes a causality constraint, namely offloading computation is performed after the ground terminal devices are accessed to the unmanned aerial vehicles; $c_{m,k}\in\{0,1\}$ denotes whether the computing tasks of the ground terminal devices m are offloaded onto the unmanned aerial vehicles, wherein 1 indicates offloading and 0 indicates not offloading; $b_{m,k}\in\{0,1\}$ denotes whether the ground terminal devices m are accessed to the unmanned aerial vehicles k, wherein 1 indicates connection, and 0 indicates no connection; C6 specifies that one ground terminal device is only capable to access to one unmanned aerial vehicle; C7 denotes a maximum number of the ground terminal devices that the unmanned aerial vehicles are capable to access; $N_k^{max}$ is a maximum number of the ground terminal devices being capable to access; C8 is a maximum distance limit between the unmanned aerial vehicles, horizontal position coordinates of the unmanned aerial vehicles k is $Q_k=(x_k, y_k)$; $Q_l$ is horizontal position coordinates of the unmanned aerial vehicles l; $d_m$ is a maximum distance between the unmanned aerial vehicles; C9 specifies that the ground terminal devices are only capable to be connected to the unmanned aerial vehicles within the maximum range of the unmanned aerial vehicles; $R_{k,m}$ is distance between the ground terminal devices m and the unmanned aerial vehicles k; $R_k^{max}$ is a maximum communication range of the unmanned aerial vehicles; C10 indicates that $c_{m,k}$, $a_{k,s}$, $b_{m,k}$, $e_{m,s}$ are binary variables; $a_{k,s}\in\{0,1\}$ indicates whether the unmanned aerial vehicles are caching services s wherein 1 indicates caching, 0 indicates no caching; $e_{m,s}\in\{0,1\}$ denotes whether the ground terminal devices m are caching services s, wherein 1 denotes caching, and 0 denotes no caching.

In some embodiments, the method for building the optimization problem of minimizing the total time delay of request tasks of all ground terminal devices includes:

Due to a covering problem of the base station, the ground terminal devices in a coverage area are not capable to directly communicate with the base station (BS); the base station is connected to a cloud center through a wired fiber-optic link, while the unmanned aerial vehicles communicate with the base station through a wireless backhaul link; assuming that a front-end and a backhaul link operate on different frequency bands, the wireless backhaul link capacity from each unmanned aerial vehicle to the base station is $R_b$, for the front-end link, the ground terminal devices within the coverage range of each unmanned aerial vehicle adopts orthogonal frequency division multiple access, and the bandwidth is evenly distributed among a plurality of ground terminal devices; assuming that the total bandwidth of uplink/downlink communication is B, the bidirectional wireless communication spectrum bandwidth from the unmanned aerial vehicles k to the ground terminal devices are $B/|M_k|$, wherein $M_k$ is the total number of users served by the unmanned aerial vehicle k;

The horizontal position coordinates of the unmanned aerial vehicles k is $Q_k=(x_k, y_k)$, the height is fixed, and the horizontal position coordinate of the ground terminal devices m is $Q_m=(x_m, y_m)$; distance between the ground terminal devices m and the unmanned aerial vehicles k is $R_{k,m}=\sqrt{(x_k-x_m)^2+(y_k-y_m)^2}$, the channel gain between the ground terminal devices m and the unmanned aerial vehicle k is $$h_{k,m}=\frac{h_0}{H^2+R_{k,m}^2},$$

$h_0$ is the channel gain when the reference distance $d_0=1$, and H is the flight altitude of each unmanned aerial vehicle; assuming that the bidirectional channel gains between the ground terminal devices m and the unmanned aerial vehicles k is the same, the uplink rate and downlink rate between the ground terminal devices m and the unmanned aerial vehicles k are $r_{m,k}^{up}$ and $r_{m,k}^{down}$, respectively:

$$\begin{cases} r_{m,k}^{up}=\frac{B}{|M_k|}\log_2\left(1+\frac{h_{k,m}p_m}{N_0}\right) \\ r_{m,k}^{down}=\frac{B}{|M_k|}\log_2\left(1+\frac{h_{k,m}p_k}{N_0}\right) \end{cases}$$

Wherein, $p_m$ is the transmission power of the ground terminal devices m, $p_k$ is the transmission power allocated by the unmanned aerial vehicles k to the ground terminal devices m, and $N_0$ is the noise power of the receiver;

The local computing time is $$t_m^l=\frac{C_m}{f_m},$$

and the energy consumption of the ground terminal devices for local computing is $E_m^l=\kappa f_m^2 C_m$, wherein, $\kappa$ is the coefficient that depends on the chip structure, $f_m$ is the computing power of the ground terminal devices, and $C_m$ is the number of CPU cycles required for the computing task of the ground terminal devices;

The ground terminal devices are selectively offloaded onto the unmanned aerial vehicles for computation, and the time for task upload to the unmanned aerial vehicles is $$t_{m,k}^u=\frac{l_m}{r_{m,k}^{up}};$$

the energy consumption for task upload is $E_{m,k}^u=p_m t_{m,k}^u$, the time for task computation is $$t_{m,k}^e=\frac{C_m}{f_{k,m}},$$

and the energy consumption for task computation is $E_{m,k}^e=\kappa(f_{k,m})^2C_m$; wherein, $l_m$ is the size of the input data for the ground terminal devices m, $f_{k,m}$ is the computing power of the unmanned aerial vehicles k on the ground terminal devices m; if the maximum computing power of the unmanned aerial vehicles k is $F_k^{max}$, then $$\sum_{m=1}^{M} f_{k,m}\le F_k^{max};$$

When local computing is selected but the ground terminal devices has not cached the corresponding service, the download time of the ground terminal devices from the unmanned aerial vehicles to the corresponding service is $$t_{k,s}^{sfw}=\frac{c_s}{r_{m,k}^{down}},$$

wherein $c_s$ is the size of the service s program; the energy consumption of the unmanned aerial vehicle k sending services s to the ground terminal devices m is $E_{k,m,s}^{sfw}=t_{k,s}^{sfw}\cdot p_k$;

If there is no service program corresponding to the user request task in the unmanned aerial vehicles, then the corresponding service needs to be downloaded remotely through the base station, and the time for downloading the service s is $$t_{back}=\frac{c_s}{R_b};$$

If the ground terminal devices m selects local computing, the total time delay $T_{m,k}^l$ of the local computing is:

$$T_{m,k}^l=e_{m,s}t_m^l(1-e_{m,s})b_{m,k}(t_{k,s}^{sfw}+t_m^l)$$

Wherein, $b_{m,k}\in\{0,1\}$ is whether the ground terminal devices m are connected to the unmanned aerial vehicles k, 1 indicates in access, and 0 indicates not in access; $e_{m,s}\in\{0, 1\}$ denotes whether the ground terminal devices m are caching services s, 1 indicates caching, 0 indicates no caching;

The total energy consumption $E_{m,k}^{l}$ for the local computing on the ground terminal devices m for the tasks is:

$$E_{m,k}^{l}=e_{m,s}E_m^{l}+(1-e_{m,s})b_{k,m}(E_m^{l}+E_{k,m,s}^{sfw})$$

The total time $T_{m,k}^{e,l}$ for computing tasks of the ground terminal devices m to be executed on the unmanned aerial vehicle k is:

$$T_{m,k}^{e,l}=(1-e_{m,s})b_{k,m}(1-a_{k,s})(t_{back}+t_{k,s}^{sfw})$$

Wherein, $a_{k,s}\in\{0,1\}$ indicates whether the unmanned aerial vehicles k are caching services, 1 indicates caching, and 0 indicates no caching;

The total energy consumption $E_{m,k}^{e,l}$ of the computing tasks of the ground terminal devices m executed on the unmanned aerial vehicles k is:

$$E_{m,k}^{e,l}=(1-e_{m,s})b_{k,m}E_{k,m,s}^{sfw}$$

If the ground terminal devices m selects computation offloading, the computing time $T_{m,k}^{e,uav}$ of the computing tasks of the ground terminal devices m on the unmanned aerial vehicle k is:

$$T_{m,k}^{e,uav}=b_{k,m}[t_{m,k}^{u}+t_{m,k}^{e}+(1-a_{k,s})t_{back}]$$

The energy consumption $E_{m,k}^{e,uav}$ of the ground terminal devices m for computing tasks on the unmanned aerial vehicles k is:

$$E_{m,k}^{e,uav}=b_{k,m}E_{m,k}^{e}$$

Wherein, $c_{m,k}\in\{0,1\}$ indicates whether the computing tasks of the ground terminal devices m are offloaded to the unmanned aerial vehicles;

The total time delay $T_m$ of completing tasks requested by the ground terminal devices m:

$$T_m=\sum_{k=1}^{K}(1-c_{m,k})\left(T_{m,k}^{l}+T_{m,k}^{e,l}\right)+\sum_{k=1}^{K}c_{m,k}T_{m,k}^{e,uav}$$

The total energy consumption $E_m$ of the ground terminal devices m:

$$E_m=\sum_{k=1}^{K}(1-c_{m,k})E_{m,k}^{l}+\sum_{k=1}^{K}C_{m,k}E_{m,k}^{u}$$

The total energy consumption $E_k$ of the unmanned aerial vehicle k:

$$E_k=\sum_{m=1}^{M}(1-c_{m,k})E_{m,k}^{e,l}+\sum_{m=1}^{M}c_{m,k}E_{m,k}^{e,uov}.$$

In some embodiments, in step S3, utilizing a pre built optimization problem that minimizes a total time delay of request tasks of all ground terminal devices to optimize to obtain a task offloading decision, an unmanned aerial vehicle resource allocation, and an unmanned aerial vehicle trajectory, including:

S31. solving the task offloading decision problem when the resource allocation and the unmanned aerial vehicle trajectory are determined to the optimization problem P1 transformed into P1.1:

$$P1.1:\min_{C}\sum_{m=1}^{M}T_m$$

$$\text{s.t. } C1, C2, C3, C5$$

slacking binary variables $c_{m,k}$ into continuous variables $\tilde{c}_{m,k}$, namely $0\le c_{m,k}\le 1$, wherein:

$$\tilde{T}_m=\sum_{k=1}^{K}\Big\{(1-\tilde{c}_{m,k})\big[e_{m,s}t_m^{l}+(1-e_{m,s})b_{m,k}a_{k,s}\left(t_{k,s}^{sfw}+t_m^{l}\right)+(1-e_{m,s})(1-a_{k,s})b_{k,m}\left(t_{m,k}^{u}+t_{m,k}^{e}+t_{back}\right)\big]+\tilde{c}_{m,k}b_{k,m}\left[t_{m,k}^{u}+t_{m,k}^{e}+(1-a_{k,s})t_{back}\right]\Big\}$$

$$\tilde{E}_m=\sum_{k=1}^{K}(1-\tilde{c}_{m,k})\left\{e_{m,s}E_m^{l}+(1-e_{m,s})\left[a_{k,s}b_{k,m}E_m^{l}+(1-a_{k,s})b_{k,m}E_{m,k}^{u}\right]\right\}+\sum_{k=1}^{K}\tilde{c}_{m,k}p_{m,k}t_{m,k}^{u}$$

$$\tilde{E}_k=\sum_{m=1}^{M}(1-\tilde{c}_{m,k})\left\{(1-e_{m,s})b_{k,m}\left[(1-a_{k,s})E_{m,k}^{e}+a_{k,s}E_{k,m,s}^{sfw}\right]\right\}+\sum_{m=1}^{M}\tilde{c}_{m,k}b_{k,m}E_{m,k}^{e}$$

wherein, $\tilde{T}_m$, $\tilde{E}_m$, and $\tilde{E}_k$ denote the total time delay of completing tasks requested by the ground terminal devices m after slacking, the total energy consumption of the ground terminal devices m, and the total energy consumption of unmanned aerial vehicles k, respectively;

then, the optimization problem P1.1 is transformed into P1.2:

P1.2

$$\min_{B,F,C,Q}\sum_{m=1}^{M}\tilde{T}_m \tag{18}$$

$$\text{s.t. } \tilde{T}_m\le D_m^{max},\ \forall\, m\in M,$$

$$\tilde{E}_m\le E_m^{max},\ \forall\, m\in M,$$

$$\tilde{E}_k\le E_k^{max},\ \forall\, k\in K,$$

$$\tilde{c}_{m,k}\le b_{m,k},\ \forall\, m\in M,\ \forall\, k\in K,$$

the optimization problem P1.2 is a linear programming problem with linear constraints, therefore, the optimization problem P1.2 is a convex problem, and using CVX in the MATLAB toolbox to solve to obtain an optimal solution $c_{m,k}$;

S32. in the case that the task offloading decision and the unmanned aerial vehicle trajectory are determined, solving the unmanned aerial vehicle resource allocation problem, based on this, the optimization problem P1 is transformed into P1.3:

$$P1.3$$

$$\min_F \sum_{m=1}^{M} T_m$$

$$\text{s.t. } C1: T_m \le D_m^{max}, \forall m \in M,$$

$$C3: E_k \le E_k^{max}, \forall k \in K,$$

$$C4: \sum_{m=1}^{M} f_{k,m} \le F_k^{max}, \forall m \in M, \forall k \in K,$$

using Lagrangian constraint condition and KKT constraint condition to solve, two constraint factors $\lambda_m$, $v_m$ are introduced, $\lambda_m>0$, $v_m>0$, and the Lagrangian formula is defined as:

$$L(f_{k,m}, \lambda_m, v_m) = \sum_{m=1}^{M} T_m + \sum_{m=1}^{M} \lambda_m\left(\kappa(f_{k,m})^2 C_m - E_k^{max}\right) + \sum_{m=1}^{M} v_m(f_{k,m} - F_k^{max})$$

since the optimization problem P1.3 is a convex problem, by applying the KKT condition, $$\frac{\partial(L(f_{k,m}, \lambda_m, v_m))}{\partial f_{k,m}} = 0$$

is obtained, and $$\lambda_m\left(\sum_{m=1}^{M} \kappa(f_{k,m})^2 C_m - E_k^{max}\right) = 0,\ v_m\left(\sum_{m=1}^{M} f_{k,m} - F_k^{max}\right) = 0;$$

solving to obtain an optimal unmanned aerial vehicle resource allocations $f_{k,m}$*:

$$f_{k,m}^* = \sqrt{\frac{E_k^{max}}{\kappa C_m}};$$

S33. in the case that the task offloading decision and the unmanned aerial vehicle resource allocation are determined, solving the unmanned aerial vehicle trajectory problem, the optimization problem P1 is transformed into the optimization problem P1.4:

$$P1.4$$

$$\min_Q \sum_{m=1}^{M} T_m$$

$$\text{s.t. } C1: T_m \le D_m^{max}, \forall m \in M,$$

$$C2: E_m \le E_m^{max}, \forall m \in M,$$

$$C3: E_k \le E_k^{max}, \forall k \in K,$$

$$C8: \|Q_k - Q_l\|^2 \le d_m^2, \forall k \in K, k \ne l,$$

the transmission time delay of the ground terminal devices in the objective function, the energy consumption of the unmanned aerial vehicle multicast software in the constraint, and the energy consumption of task upload are non convex, but for variable $Q_k$, the formula $\|Q_k-Q_l\|^2$ is convex, thus, the continuous convex approximation method is applied; because the first-order Taylor expansion at any point of any convex function is the global lower bound of the convex function, the convex function is approximated by the first-order Taylor expansion; the transmission rate $r_{m,k}^{up}$ from the ground terminal devices to the unmanned aerial vehicles is approximately:

$$r_{m,k}^{up} = \frac{B}{|M_k|}\log_2\left(1 + \frac{h_{k,m}p_m}{N_0}\right) \ge \frac{B}{|M_k|}\log_2\left(1 + \frac{h_0 p_m}{(H^2 + \|Q_k[i] - Q_l\|^2)N_0} - Z_{m,k}[i](\|Q_k - Q_l\|^2 - \|Q_k[i] - Q_l\|^2)\right) = r_{k,m}^{lb}$$

wherein $$Z_{m,k}[i] = \frac{G_{m,k}\log_2 e}{(G_{m,k} + H^2 + \|Q_k[i] - Q_m\|^2)(H^2 + \|Q_k[i] - Q_m\|^2)},$$

$$G_{m,k} = \frac{h_0 p_{k,m}}{N_0};$$

wherein, $Q_k[i]$ is the i-th Taylor expansion for the unmanned aerial vehicle trajectory, $Z_{m,k}[i]$ and $G_{m,k}$ are intermediate parameters; when introducing intermediate parameters $r_{k,m}^{lb}$ into the optimization problem P1.4, P1.4 is a standard convex optimization problem, using CVX in the MATLAB toolbox to solve to obtain an optimal solution $Q_k$;

S34. through iterative solving the three sub-problems P1.2, P1.3, and P1.4, and updating the corresponding solutions to obtain the solution for P1: task offloading decision, the unmanned aerial vehicle resource allocation, and the unmanned aerial vehicle trajectory.

In the second aspect, the present disclosure provides an unmanned aerial vehicle assisted task offloading and resource allocation device based on service caching, including a processor and a storage medium;

the storage medium is configured to store instructions; and the processor is configured to operate according to the instructions to execute the method according to the first aspect.

In the third aspect, the present disclosure provides a device including a memory;

a processor;

and a computer program;

wherein, the computer program is stored in the memory and configured to be executed by the processor to implement the method described in the first aspect.

In the fourth aspect, the present disclosure provides a storage medium on which a computer program is stored, and the method described in the first aspect is implemented when the computer program is executed by a processor.

Advantageous effects: Compared to prior art, the advantages of the present disclosure include:

1. The present disclosure comprehensively considers introducing the concept of service caching into mobile edge computing based on UAV assistance. When the computing task is offloaded to the MEC server, the server must have a corresponding service program to complete the corresponding computing task. Service caching effectively reduces real-time time delay and communication costs for obtaining and initializing service disclosures.

2. The present disclosure jointly considers caching all required services in advance in the UAV based on local popularity, effectively reducing user completion time delay.
3. Unlike traditional computing task offloading methods, this method fully utilizes the mobility of UAV and jointly optimizes the three sub-problems of computing resource allocation and UAV placement, effectively reducing task completion time delay.

DETAILED DESCRIPTION OF THE EMBODIMENTS

Figure 1:
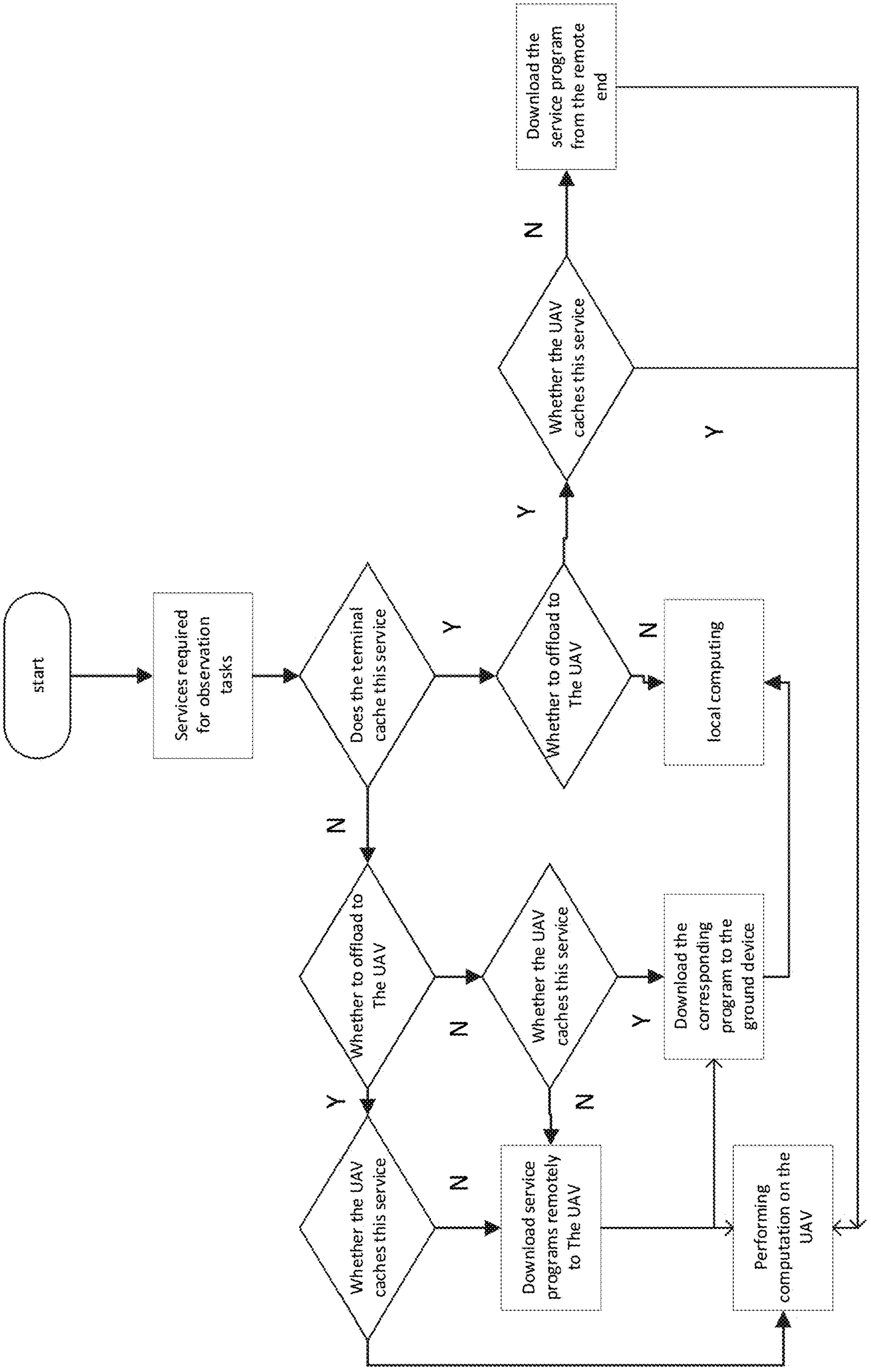
FIG. 1 is a flow chart of the method provided according to an embodiment of the present disclosure.

The present disclosure will be further described in conjunction with the accompanying drawings. The following embodiments are only intended to provide a clearer illustration of the technical solution of the present disclosure and should not be regarded as a limitation to the scope of the present disclosure.

In the description of the present disclosure, "several" refers to one or more, "a plurality of" refers to two or more, "greater than", "less than", "over", etc. are understood as not including the number itself, and "above", "below", "within", etc. are understood as including the number itself. If there is a description that the first and second, they are only for the purpose of distinguishing technical features, and cannot be understood as indicating or implying relative importance or implying the quantity or sequence of the indicated technical features.

In the description of the present disclosure, the reference terms "one embodiment", "some embodiments", "illustrative embodiments", "examples", "specific examples", or "some examples", etc. refer to specific features, structures, materials, or features described in conjunction with the embodiments or examples included in at least one embodiment or example of the present disclosure. In this disclosure, the illustrative expressions of the above terms may not necessarily refer to the same embodiments or examples. Moreover, the specific features, structures, materials, or features described can be combined in an appropriate manner in any one or more embodiments or examples.

Embodiment 1

In the first aspect, an unmanned aerial vehicle assisted task offloading and resource allocation method based on service caching is provided in the present embodiment, which includes:

S1. obtaining local popularity based on historical required services of ground terminal devices, selective caching required services for unmanned aerial vehicle based on the local popularity to obtain a caching solution of the unmanned aerial vehicles;

S2. applying, by the ground terminal devices, a random caching service to obtain a caching solution of the ground terminal devices;

S3. in response to task requests from the ground terminal devices, based on the caching solution of the unmanned aerial vehicle and the caching solution of the ground terminal devices, utilizing a pre built optimization problem that minimizes a total time delay of request tasks of all ground terminal devices to optimize to obtain a task offloading decision, an unmanned aerial vehicle resource allocation, and an unmanned aerial vehicle trajectory;

S4. determining, according to the optimized task offloading decision, a task requested by the ground terminal devices to perform computation on a local terminal device, or offload the task to the corresponding unmanned aerial vehicle for computation; the unmanned aerial vehicle is flying according to the optimized unmanned aerial vehicle trajectory; and allocating resources to the ground terminal devices based on the optimized unmanned aerial vehicle resource allocation.

In some embodiments, the step S4 includes:

S41. performing computation to the task requested by the ground terminal devices on the local terminal device;

S411. if the required services has been cached in the ground terminal devices, performing task computation directly;

S412. if the ground terminal devices do not cache the required services, but there are services requested by the ground terminal devices cached on the unmanned aerial vehicle, then based on the optimized unmanned aerial vehicle trajectory and the optimized unmanned aerial vehicle resource allocation, downloading the corresponding service program from the unmanned aerial vehicles to the ground terminal devices, and performing computing services on the ground terminal devices directly;

S413. if the ground terminal devices do not cache the required services and the unmanned aerial vehicles do not cache the services requested by the ground terminal devices, using a wireless backhaul link to download the service program from a remote end to the unmanned aerial vehicles through a base station; based on the optimized unmanned aerial vehicle trajectory and the optimized unmanned aerial vehicle resource allocation, downloading the corresponding service program from the unmanned aerial vehicles to the ground terminal devices, and performing computing services on the ground terminal devices directly.

In some embodiments, step S4 includes:

S42. offloading, by the ground terminal devices, tasks to the corresponding unmanned aerial vehicle for computation;

S421. services requested by the ground terminal devices are cached in the unmanned aerial vehicles, performing computation directly on the unmanned aerial vehicles based on the optimized unmanned aerial vehicle trajectory and the optimized unmanned aerial vehicle resource allocation;

S422. if there is no cached services requested by ground terminal devices in the unmanned aerial vehicles, using a wireless backhaul link to download service programs from a remote end to the unmanned aerial vehicles through a base station, and performing computation based on the optimized unmanned aerial vehicle trajectory and the optimized unmanned aerial vehicle resource allocation on the unmanned aerial vehicles.

Figure 2:
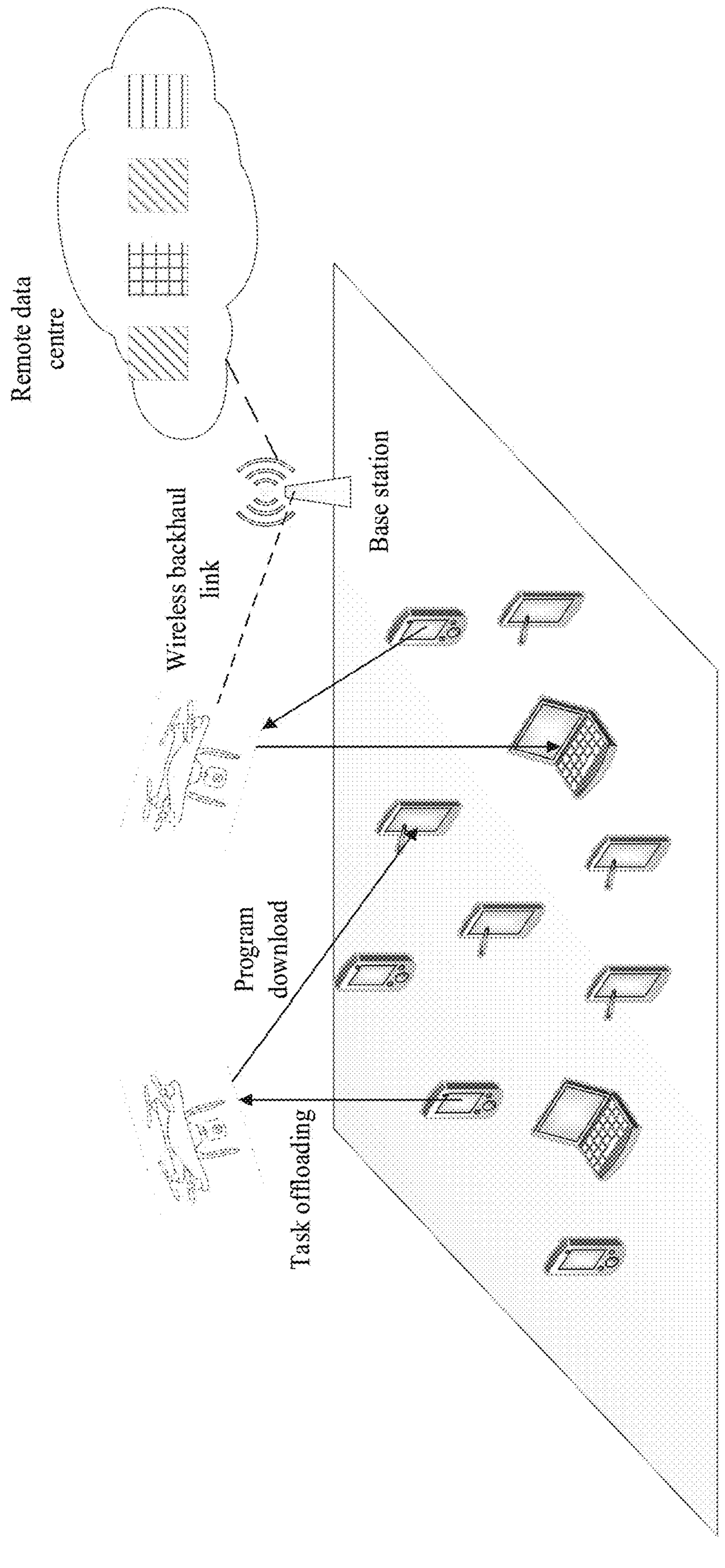
FIG. 2 is a schematic diagram of the system model provided according to an embodiment of the present disclosure.

In some specific embodiments, referring to FIG. 1 and FIG. 2, this embodiment provides a multi UAV assisted mobile edge computing MEC system, which includes a base station, K of rotor UAVs and M of ground terminal devices, K={1, 2, . . . , K} and M={1, 2, . . . , M} are sets of UAVs and ground terminal devices, respectively. Each UAV is equipped with a small server that provides computing and caching services for ground terminal devices. The unmanned aerial vehicle cache services based on popularity, while terminal devices use random caching to cache services.

In some embodiments, step S1 includes:

S11. an access method between the ground terminal devices and the unmanned aerial vehicles adopts a closest distance access, when the ground terminal devices are within a coverage range of the unmanned aerial vehicles, the nearest unmanned aerial vehicle provides services; setting $M_k$ as the number of the ground terminal devices served by the unmanned aerial vehicle k;

S12. a request probability of service s from the ground terminal devices m is $P_{ms}$, and a request probability matrix P for all ground terminal devices are:

$$P=\begin{pmatrix} p_{11} & \cdots & p_{1S} \\ \vdots & \ddots & \vdots \\ p_{M1} & \cdots & p_{MS} \end{pmatrix}$$

S13. obtaining local popularity $p_s^k$ based on the request probability $p_{ms}$ of services from the ground terminal devices m $$p_s^k=\frac{\sum_{m\in M_k} p_{ms}}{|M_k|}$$

S14. since there is no coupling of content deployment between the unmanned aerial vehicles, in order to improve a hit ratio of caching services of the unmanned aerial vehicles, service programs with high local popularity are cached in the unmanned aerial vehicles.

In some embodiments, the method for building the optimization problem of minimizing the total time delay of request tasks of all ground terminal devices includes:

due to a covering problem of the base station, the ground terminal devices in a coverage area are not capable to directly communicate with the base station (BS); the base station is connected to a cloud center through a wired fiber-optic link, while the unmanned aerial vehicles communicate with the base station through a wireless backhaul link; assuming that a front-end and a backhaul link operate on different frequency bands, the wireless backhaul link capacity from each unmanned aerial vehicle to the base station (BS) is $R_b$, for the front-end link, the ground terminal devices within the coverage range of each unmanned aerial vehicle adopts orthogonal frequency division multiple access, and the bandwidth is evenly distributed among a plurality of ground terminal devices; assuming that the total bandwidth of uplink/downlink communication is B, the bidirectional wireless communication spectrum bandwidth from the unmanned aerial vehicle k to the ground terminal devices are $B/|M_k|$, wherein $M_k$ is the total number of users served by the unmanned aerial vehicle k;

the horizontal position coordinate of the unmanned aerial vehicle k is $Q_k=(x_k, y_k)$, the height is fixed, and the horizontal position coordinate of the ground terminal devices m is $Q_m=(x_m, y_m)$; distance between the ground terminal devices m and the unmanned aerial vehicle k is $R_{k,m}=\sqrt{(x_k-x_m)^2+(y_k-y_m)^2}$, the channel gain between the ground terminal devices m and the unmanned aerial vehicle k is $$h_{k,m}=\frac{h_0}{H^2+R_{k,m}^2},$$

$h_0$ is the channel gain when the reference distance $d_0=1$, and H is the flight altitude of each unmanned aerial vehicle; assuming that the bidirectional channel gain between the ground terminal devices m and the unmanned aerial vehicle k is the same, the uplink rate and downlink rate between the ground terminal devices m and the unmanned aerial vehicle k are $r_{m,k}^{up}$ and $r_{m,k}^{down}$, respectively:

$$\begin{cases} r_{m,k}^{up}=\frac{B}{|M_k|}\log_2\left(1+\frac{h_{k,m}p_m}{N_0}\right) \\ r_{m,k}^{down}=\frac{B}{|M_k|}\log_2\left(1+\frac{h_{k,m}p_k}{N_0}\right) \end{cases}$$

wherein, $p_m$ is the transmission power of the ground terminal devices m, $p_k$ is the transmission power allocated by the unmanned aerial vehicle k to the ground terminal devices m, and $N_0$ is the noise power of the receiver;

the local computing time is $$t_m^l=\frac{C_m}{f_m},$$

and the energy consumption of the ground terminal devices for local computing is $E_m^l=\kappa f_m^2 C_m$, wherein, κ is the coefficient that depends on the chip structure, $f_m$ is the computing power of the ground terminal devices, and $C_m$ is the number of CPU cycles required for the computing task of the ground terminal devices;

the ground terminal devices are selectively offloaded onto the unmanned aerial vehicle for computation, and the time for task upload to the unmanned aerial vehicle is $$t_{m,k}^u=\frac{l_m}{r_{m,k}^{up}};$$

the energy consumption for task upload is $E_{m,k}^u=p_m t_{m,k}^u$, the time for task computation is $$t_{m,k}^e=\frac{C_m}{f_{k,m}},$$

and the energy consumption for task computation is $E_{m,k}^{e}=\kappa(f_{k,m})^2C_m$; wherein, $l_m$ is the size of the input data for the ground terminal devices m, $f_{k,m}$ is the computing power of the unmanned aerial vehicle k on the ground terminal devices m; if the maximum computing power of the unmanned aerial vehicle k is $F_k^{max}$, then $$\sum_{m=1}^{M} f_{k,m} \le F_k^{max};$$

when local computing is selected but the ground terminal devices has not cached the corresponding service, the download time of the ground terminal devices from the unmanned aerial vehicle to the corresponding service is $$t_{k,s}^{sfw} = \frac{c_s}{r_{m,k}^{down}},$$

wherein $c_s$ is the size of the service s program; the energy consumption of the unmanned aerial vehicle k sending services s to the ground terminal devices m is $E_{k,m,s}^{sfw}=t_{k,s}^{sfw}\cdot p_k$;

if there is no service program corresponding to the user request task in the unmanned aerial vehicle, then the corresponding service needs to be downloaded remotely through the base station, and the download time for the service s is $$t_{back} = \frac{c_s}{R_b};$$

if the ground terminal devices m selects local computing, the total time delay $T_{m,k}^{l}$ of local computing is:

$$T_{m,k}^{l}=e_{m,s}t_m^{l}(1-e_{m,s})b_{m,k}(t_{k,s}^{sfw}+t_m^{l})$$

wherein, $b_{m,k}\in\{0,1\}$ is whether the ground terminal devices m is connected to the unmanned aerial vehicle k, 1 indicates in access, and 0 indicates not in access; $e_{m,s}\in\{0,1\}$ denotes whether the ground terminal devices m are caching services s, 1 indicates caching, 0 indicates no caching;

the total energy consumption $E_{m,k}^{l}$ for the local computing on the ground terminal devices m for the tasks is:

$$E_{m,k}^{l}=e_{m,s}E_m^{l}+(1-e_{m,s})b_{k,m}(E_m^{l}+E_{k,m,s}^{sfw})$$

the total time $T_{m,k}^{e,l}$ for computing tasks of the ground terminal devices m to be executed on the unmanned aerial vehicle k is:

$$T_{m,k}^{e,l}=(1-e_{m,s})b_{k,m}(1-a_{k,s})(t_{back}+t_{k,s}^{sfw})$$

wherein, $a_{k,s}\in\{0,1\}$ indicates whether the unmanned aerial vehicles k are caching services, 1 indicates caching, and 0 indicates no caching;

the total energy consumption $E_{m,k}^{e,l}$ of computing tasks of the ground terminal devices m executed on the unmanned aerial vehicles k is:

$$E_{m,k}^{e,l}=(1-e_{m,s})b_{k,m}E_{k,m,s}^{sfw}$$

if the ground terminal devices m selects computation offloading, the computing time $T_{m,k}^{e,uav}$ of computing tasks of the ground terminal devices m on the unmanned aerial vehicle k is:

$$T_{m,k}^{e,uav}=b_{k,m}[t_{m,k}^{u}+t_{m,k}^{e}+(1-a_{k,s})t_{back}]$$

the energy consumption $E_{m,k}^{e,uav}$ of the ground terminal devices m for computing tasks on the unmanned aerial vehicle k is:

$$E_{m,k}^{e,uav}=b_{k,m}E_{m,k}^{e}$$

wherein, $c_{m,k}\in\{0,1\}$ indicates whether the computing tasks of the ground terminal devices m are offloaded to the unmanned aerial vehicles;

the total time delay $T_m$ of completing tasks requested by the ground terminal devices m:

$$T_m = \sum_{k=1}^{K}(1-c_{m,k})\left(T_{m,k}^{l}+T_{m,k}^{e,l}\right)+\sum_{k=1}^{K}c_{m,k}T_{m,k}^{e,uav}$$

total energy consumption $E_m$ of the ground terminal devices m:

$$E_m = \sum_{k=1}^{K}(1-c_{m,k})E_{m,k}^{l}+\sum_{k=1}^{K}c_{m,k}E_{m,k}^{u}$$

total energy consumption $E_k$ of the unmanned aerial vehicle k:

$$E_k = \sum_{m=1}^{M}(1-c_{m,k})E_{m,k}^{e,l}+\sum_{m=1}^{M}c_{m,k}E_{m,k}^{e,uav}.$$

In some embodiments, in step S3, a optimization problem P1 of minimizing the total time delay of request tasks of all ground terminal devices includes:

$$P1: \min_{B,F,C,Q}\sum_{m=1}^{M}T_m$$

$$\begin{aligned}
\text{s.t. } & C1{:}T_m \le D_m^{max},\ \forall\, m\in M,\\
& C2{:}E_m \le E_m^{max},\ \forall\, m\in M,\\
& C3{:}E_k \le E_k^{max},\ \forall\, k\in K,\\
& C4{:}\sum_{m=1}^{M} f_{k,m} \le F_k^{max},\ \forall\, m\in M, \forall\, k\in K,\\
& C5{:}c_{m,k} \le b_{m,k},\ \forall\, m\in M, \forall\, k\in K,\\
& C6{:}\sum_{k=1}^{K} b_{m,k} = 1,\ \forall\, m\in M, \forall\, k\in K,\\
& C7{:}\sum_{m=1}^{M} b_{m,k} \le N_k^{max},\ \forall\, m\in M, \forall\, k\in K,\\
& C8{:}\|Q_k-Q_l\|^2 \le d_m^2,\ \forall\, k\in K, k\neq l,\\
& C9{:}b_{m,k}(R_{k,m}) \le R_k^{max},\ \forall\, m\in M, \forall\, k\in K,\\
& C10{:}c_{m,k},\ a_{k,s},\ b_{m,k},\ e_{m,s}\in\{0,1\},\ \forall\, m\in M, \forall\, k\in K,
\end{aligned}$$

wherein, C1 denotes the time delay limit; $T_m$ denotes a total time delay for completing tasks requested by the ground terminal devices m; $K=\{1, 2, \ldots, K\}$ and $M=\{1, 2, \ldots, M\}$ denote sets of the unmanned aerial vehicles (UAV) and the ground terminal devices, respectively; $B=(b_{m,k}\in\{0,1\}:m\in M, k\in K)$ denotes a set of whether the ground terminal devices m are accessed to the unmanned aerial vehicle k; $F=(f_{k,m}:m\in M, k\in K)$ denotes a set of computing capabilities of the unmanned aerial vehicles k on the ground terminal devices m $c=(c_{m,k}\in\{0,1\}: m\in M, k\in K)$ denotes a set of whether the computing tasks of the ground terminal devices m are offloaded to the unmanned aerial vehicles; $Q=(Q_k:k\in K)$ denotes horizontal position coordinates of the unmanned aerial vehicles k; $D_m^{max}$ denotes a maximum time delay of the tasks of the ground terminal devices m, $\forall$ denotes any mathematical symbol; C2 denotes an user energy consumption limit, $E_m$ denotes total energy consumption of the ground terminal devices m, $E_m^{max}$ denotes maximum energy consumption of the ground terminal devices m; C3 denotes an energy consumption limit of the unmanned aerial vehicles, $E_k$ denotes total energy consumption of the unmanned aerial vehicles k, $E_k^{max}$ denotes maximum energy consumption of the unmanned aerial vehicles; C4 denotes resource limitation allocated to the unmanned aerial vehicles; $f_{k,m}$ denotes computing capabilities of the unmanned aerial vehicles k towards the ground terminal devices m; $F_k^{max}$ denotes the maximum computing capabilities of the unmanned aerial vehicles k; C5 denotes a causality constraint, namely offloading computation is performed after the ground terminal devices are accessed to the unmanned aerial vehicles; $c_{m,k}\in\{0,1\}$ denotes whether the computing tasks of the ground terminal devices m are offloaded onto the unmanned aerial vehicles, wherein 1 indicates offloading and 0 indicates not offloading; $b_{m,k}\in\{0,1\}$ denotes whether the ground terminal devices m are accessed to the unmanned aerial vehicles k, wherein 1 indicates in access, and 0 indicates not in access; C6 specifies that one ground terminal device is only capable to access to one unmanned aerial vehicle; C7 denotes a maximum number of the ground terminal devices that the unmanned aerial vehicle is capable to access, $N_k^{max}$ is a maximum number of the ground terminal devices being capable to access; C8 is a maximum distance limit between the unmanned aerial vehicles, horizontal position coordinates of the unmanned aerial vehicles k is $Q_k=(x_k, y_k)$; $Q_l$ is horizontal position coordinates of the unmanned aerial vehicles l; $d_m$ is a maximum distance between the unmanned aerial vehicles; C9 specifies that the ground terminal devices are only capable to be connected to the unmanned aerial vehicles within the maximum range of the unmanned aerial vehicles; $R_{k,m}$ is distance between the ground terminal devices m and the unmanned aerial vehicle k; $R_k^{max}$ is a maximum communication range of the unmanned aerial vehicles; C10 indicates that $c_{m,k}$, $a_{k,s}$, $b_{m,k}$, $e_{m,s}$ are binary variables; $a_{k,s}\in\{0,1\}$ indicates whether the unmanned aerial vehicles are caching services s, wherein 1 indicates caching, 0 indicates no caching; $e_{m,s}\in\{0,1\}$ denotes whether the ground terminal devices m are caching services s wherein 1 denotes caching, and 0 denotes no caching.

In some embodiments, in step S3, utilizing a pre built optimization problem that minimizes a total time delay of request tasks of all ground terminal devices to optimize to obtain a task offloading decision, an unmanned aerial vehicle resource allocation, and an unmanned aerial vehicle trajectory, including:

S31. solving the task offloading decision problem when the resource allocation and the unmanned aerial vehicle trajectory are determined to the optimization problem P1 transformed into P1.1:

$$P1.1{:}\min_{C}\sum_{m=1}^{M}T_m \text{ s.t. } C1, C2, C3, C5$$

slacking binary variables $c_{m,k}$ into continuous variables $\tilde{c}_{m,k}$, namely $0\le c_{m,k}\le 1$, wherein:

$$\tilde{T}_m = \sum_{k=1}^{K}\Big\{(1-\tilde{c}_{m,k})\big[e_{m,s}t_m^l + (1-e_{m,s})b_{m,k}a_{k,s}\big(t_{k,s}^{sfw}+t_m^l\big) + (1-e_{m,s})(1-a_{k,s})b_{k,m}\big(t_{m,k}^u + t_{m,k}^e + t_{back}\big)\big] + \tilde{c}_{m,k}b_{k,m}\big[t_{m,k}^u + t_{m,k}^e + (1-a_{k,s})t_{back}\big]\Big\}$$

$$\tilde{E}_m = \sum_{k=1}^{K}(1-\tilde{c}_{m,k})\Big\{e_{m,s}E_m^l + (1-e_{m,s})\big[a_{k,s}b_{k,m}E_m^l + (1-a_{k,s})b_{k,m}E_{m,k}^u\big]\Big\} + \sum_{k=1}^{K}\tilde{c}_{m,k}p_{m,k}t_{m,k}^u$$

$$\tilde{E}_k = \sum_{m=1}^{M}(1-\tilde{c}_{m,k})\Big\{(1-e_{m,s})b_{k,m}\big[(1-a_{k,s})E_{m,k}^e + a_{k,s}E_{k,m,s}^{sfw}\big]\Big\} + \sum_{m=1}^{M}\tilde{c}_{m,k}b_{k,m}E_{m,k}^e$$

wherein, $\tilde{T}_m$, $\tilde{E}_m$ and $\tilde{E}_k$ denote the total time delay of completing tasks requested by the ground terminal devices m after slacking, the total energy consumption of the ground terminal devices m, and the total energy consumption of unmanned aerial vehicles k, respectively;

then, the optimization problem P1.1 is transformed into P1.2:

$$P1.2{:}\ \min_{B,F,C,Q}\sum_{m=1}^{M}\tilde{T}_m$$

$$\begin{aligned}\text{s.t. }\ &\tilde{T}_m \le D_m^{max},\ \forall m\in M,\\ &\tilde{E}_m \le E_m^{max},\ \forall m\in M\\ &\tilde{E}_k \le E_k^{max},\ \forall k\in K,\\ &\tilde{c}_{m,k} \le b_{m,k},\ \forall m\in M, \forall k\in K,\end{aligned}$$

the optimization problem P1.2 is a linear programming problem with linear constraints, therefore, the optimization problem P1.2 is a convex problem, and using CVX in the MATLAB toolbox to solve to obtain an optimal solution $C_{m,k}$.

S32. in the case that the task offloading decision and the unmanned aerial vehicle trajectory are determined, solving the unmanned aerial vehicle resource allocation problem, based on this, the optimization problem P1 is transformed into P1.3:

$$P1.3: \min_{F} \sum_{m=1}^{M} T_m$$

$$\text{s.t. } C1: T_m \le D_m^{max},\ \forall\, m \in M,$$

$$C3: E_k \le E_k^{max},\ \forall\, k \in K,$$

$$C4: \sum_{m=1}^{M} f_{k,m} \le F_k^{max},\ \forall\, m \in M, \forall\, k \in K,$$

using Lagrangian constraint condition and KKT constraint condition to solve, two constraint factors $\lambda_m$, $v_m$ are introduced, $\lambda_m>0$, $v_m>0$, and the Lagrangian formula is defined as:

$$L(f_{k,m}, \lambda_m, V_m) = \sum_{m=1}^{M} T_m + \sum_{m=1}^{M} \lambda_m\left(\kappa(f_{k,m})^2 C_m - E_k^{max}\right) + \sum_{m=1}^{M} v_m\left(f_{k,m} - F_k^{max}\right)$$

since the optimization problem P1.3 is a convex problem, by applying the KKT condition, $$\frac{\partial (L(f_{k,m}, \lambda_m, v_m))}{\partial f_{k,m}} = 0$$

is obtained and $$\lambda_m\left(\sum_{m=1}^{M} \kappa(f_{k,m})^2 C_m - E_k^{max}\right) = 0,\ v_m\left(\sum_{m=1}^{M} f_{k,m} - F_k^{max}\right) = 0;$$

solving to obtain an optimal unmanned aerial vehicle resource allocations $f_{k,m}$*:

$$f_{k,m}^* = \sqrt{\frac{E_k^{max}}{\kappa C_m}};$$

S33. in the case that the task offloading decision and the unmanned aerial vehicle resource allocation are determined, solving the unmanned aerial vehicle trajectory problem, the optimization problem P1 is transformed into the optimization problem P1.4:

$$P1.4: \min_{Q} \sum_{m=1}^{M} T_m$$

$$\text{s.t. } C1: T_m \le D_m^{max}, \forall\, m \in M,$$

$$C2: E_m \le E_m^{max},\ \forall\, m \in M,$$

$$C3: E_k \le E_k^{max},\ \forall\, k \in K,$$

$$C8: \|Q_k - Q_l\|^2 \le d_m^2, \forall\, k \in K, k \ne l,$$

the transmission time delay of the ground terminal devices in the objective function, the energy consumption of the unmanned aerial vehicle multicast software in the constraint, and the energy consumption of task upload are non convex, but for variable $Q_k$, the formula $\|Q_k - Q_l\|^2$ is convex, thus, the continuous convex approximation method is applied; because the first-order Taylor expansion at any point of any convex function is the global lower bound of the convex function, the convex function is approximated by the first-order Taylor expansion; the transmission rate $r_{m,k}^{up}$ from the ground terminal devices to the unmanned aerial vehicles is approximately:

$$r_{m,k}^{up} = \frac{B}{|M_k|}\log_2\left(1 + \frac{h_{k,m}p_m}{N_0}\right) \ge \frac{B}{|M_k|}\log_2 \left(1 + \frac{h_0 p_m}{(H^2 + \|Q_k[i] - Q_l\|^2)N_0} - Z_{m,k}[i]\left(\|Q_k - Q_l\|^2 - \|Q_k[i] - Q_l\|^2\right) = r_{k,m}^{lb}\right.$$

wherein, $$Z_{m,k}[i] = \frac{G_{m,k}\log_2 e}{(G_{m,k} + H^2 + \|Q_k[i] - Q_m\|^2)(H^2 + \|Q_k[i] - Q_m\|^2)},$$

$$G_{m,k} = \frac{h_0 p_{k,m}}{N_0};$$

wherein, $Q_k[i]$ is the i-th Taylor expansion for the unmanned aerial vehicle trajectory, $Z_{m,k}[i]$ and $G_{m,k}$ are intermediate parameters; when introducing intermediate parameters $r_{k,m}^{lb}$ into the optimization problem P1.4, P1.4 is a standard convex optimization problem, using CVX in the MATLAB toolbox to solve to obtain an optimal solution $Q_k$;

S34. through iterative solving the three sub-problems P1.2, P1.3, and P1.4, and updating the corresponding solutions to obtain the solution for P1: task offloading decision, the unmanned aerial vehicle resource allocation, and the unmanned aerial vehicle trajectory.

Due to the fact that the object value of P1 does not increase after each iteration and the optimal value is also bounded, S34 ensures convergence after a finite number of iterations.

Embodiment 2

In the second aspect, based on Embodiment 1, this embodiment provides an unmanned aerial vehicle assisted task offloading and resource allocation device based on service caching, including a processor and a storage medium.

The storage medium is configured to store instructions.

The processor is configured to operate according to the instructions to execute the method according to Embodiment 1.

Embodiment 3

In the third aspect, based on Embodiment 1, this embodiment provides a device comprising:

a memory;

a processor;

and a computer program;

wherein, the computer program is stored in the memory and configured to be executed by the processor to implement the method described in Embodiment 1.

Embodiment 4

In the fourth aspect, based on Embodiment 1, this embodiment provides a storage medium on which a computer program is stored, and the method described in Embodiment 1 is implemented when the computer program is executed by a processor.

The skilled person in the art should understand that embodiments of this disclosure may be provided as methods, systems, or computer program products. Therefore, this disclosure may take the form of a complete hardware embodiment, a complete software embodiment, or a embodiment in combination of software and hardware. Moreover, this disclosure may take the form of a computer program product implemented on one or more computer available storage media (including but not limited to magnetic disk memory, CD-ROM, optical storage, etc.) containing computer available program code.

This disclosure is described with reference to the flowchart and/or block diagram of the method, device (system), and computer program product according to the embodiments of this disclosure. It should be understood that each process and/or block in the flowchart and/or block diagram, and the combination of processes and/or blocks in the flowchart and/or block diagram are implemented by computer program instructions. These computer program instructions can be provided to processors of general-purpose computers, specialized computers, embedded processors, or other programmable data processing devices to generate a machine that generates instructions executed by processors of computers or other programmable data processing devices to implement the functions specified in one or more processes and/or blocks in a flowchart or block diagram.

These computer program instructions can also be stored in computer-readable memory that can guide computers or other programmable data processing devices to work in a specific way, so that the instructions stored in the computer-readable memory generate a manufacturing product including an instruction device that implements the functions specified in one or more processes and/or blocks of a flowchart or block diagram.

These computer program instructions can also be loaded onto computers or other programmable data processing devices to perform a series of operational steps on the computer or other programmable devices to generate computer-implemented processing. The instructions executed on the computer or other programmable devices provide steps for implementing the functions specified in one or more processes and/or blocks in a flowchart or block diagram.

The above is only a preferred embodiment of the present disclosure. It should be understood that for ordinary skilled person in the art, several improvements and modifications can be made without departing from the principles of the present disclosure, and these improvements and modifications should also be considered as the scope of the present disclosure.

What is claimed is:

1. An unmanned aerial vehicle assisted task offloading and resource allocation method based on service caching, comprising:

S1. obtaining local popularity based on historically required services of ground terminal devices, selectively caching the required services, by unmanned aerial vehicles, based on the local popularity to obtain a caching solution of the unmanned aerial vehicles;

S2. applying a random caching service to obtain a caching solution of the ground terminal devices;

S3. in response to task requests from the ground terminal devices, based on the caching solution of the unmanned aerial vehicles and the caching solution of the ground terminal devices, utilizing a pre built optimization problem that minimizes a total time delay of the request tasks of all ground terminal devices to optimize, so as to obtain a task offloading decision, an unmanned aerial vehicle resource allocation, and an unmanned aerial vehicle trajectory;

S4. determining, according to the optimized task offloading decision, tasks requested by the ground terminal devices to perform computation on a local terminal device, or offload the tasks to the corresponding unmanned aerial vehicles for computation; flying the unmanned aerial vehicles according to the optimized unmanned aerial vehicle trajectory; and allocating resources to the ground terminal devices based on the optimized unmanned aerial vehicle resource allocation.

2. The unmanned aerial vehicle assisted task offloading and resource allocation method based on service caching according to claim 1, wherein the step S4 comprises:

S41. performing computation to the tasks requested by the ground terminal devices on the local terminal device;

S411. if the required services has been cached in the ground terminal devices, performing task computation directly;

S412. if the ground terminal devices do not cache the required services, but there are services requested by the ground terminal devices cached on the unmanned aerial vehicles, then based on the optimized unmanned aerial vehicle trajectory and the optimized unmanned aerial vehicle resource allocation, downloading a corresponding service program from the unmanned aerial vehicles to the ground terminal devices, and performing computing services on the ground terminal devices directly;

S413. if the ground terminal devices do not cache the required services and the unmanned aerial vehicles do not cache the services requested by the ground terminal devices, using a wireless backhaul link to download the service program from a remote end to the unmanned aerial vehicles through a base station; based on the optimized unmanned aerial vehicle trajectory and the optimized unmanned aerial vehicle resource allocation, downloading the corresponding service program from the unmanned aerial vehicles to the ground terminal devices, and performing computing services on the ground terminal devices directly.

3. The unmanned aerial vehicle assisted task offloading and resource allocation method based on service caching according to claim 1, wherein step S4 comprises:

S42. offloading, by the ground terminal devices, the tasks to the corresponding unmanned aerial vehicles for computation;

S421. services requested by the ground terminal devices are cached in the unmanned aerial vehicles, performing computation directly on the unmanned aerial vehicles based on the optimized unmanned aerial vehicle trajectory and the optimized unmanned aerial vehicle resource allocation;

S422. if there is no cached services requested by ground terminal devices in the unmanned aerial vehicles, using a wireless backhaul link to download service programs from a remote end to the unmanned aerial vehicles through a base station, and performing computation based on the optimized unmanned aerial vehicle trajectory and the optimized unmanned aerial vehicle resource allocation on the unmanned aerial vehicles.

4. The unmanned aerial vehicle assisted task offloading and resource allocation method based on service caching according to claim 1, wherein step S1 comprises:

S11. an access method between the ground terminal devices and the unmanned aerial vehicles applies a closest distance access, when the ground terminal devices are within a coverage range of the unmanned aerial vehicles, the nearest unmanned aerial vehicle provides services; setting $M_k$ as the number of the ground terminal devices served by the unmanned aerial vehicles k;

S12. a request probability of services from the ground terminal devices m is $p_{ms}$, and a request probability matrix p for all ground terminal devices are:

$$P = \begin{pmatrix} p_{11} & \cdots & p_{1S} \\ \vdots & \ddots & \vdots \\ p_{M1} & \cdots & p_{MS} \end{pmatrix}$$

S13. obtaining local popularity $p_s^k$ based on the request probability $p_{ms}$ of service s from the ground terminal devices m:

$$p_s^k = \frac{\sum_{m \in M_k} p_{ms}}{|M_k|}$$

S14. caching service programs with high local popularity in the unmanned aerial vehicles, in order to improve a hit ratio of caching services of the unmanned aerial vehicles, since there is no coupling of content deployment between the unmanned aerial vehicles.

5. The unmanned aerial vehicle assisted task offloading and resource allocation method based on service caching according to claim 1, wherein, in step S3, a optimization problem P1 of minimizing the total time delay of request tasks of all ground terminal devices comprises:

$$P1: \min_{BF,C,Q} \sum_{m=1}^{M} T_m$$

$$\text{s.t. } C1: T_m \le D_m^{max}, \forall m \in M,$$

$$C2: E_m \le E_m^{max}, \forall m \in M,$$

$$C3: E_k \le E_k^{max}, \forall k \in K,$$

$$C4: \sum_{m=1}^{M} f_{k,m} \le F_k^{max}, \forall m \in M, \forall k \in K,$$

$$C5: c_{m,k} \le b_{m,k}, \forall m \in M, \forall k \in K,$$

$$C6: \sum_{k=1}^{K} b_{m,k} = 1, \forall m \in M, \forall k \in K,$$

$$C7: \sum_{m=1}^{M} b_{m,k} \le N_k^{max}, \forall m \in M, \forall k \in K,$$

-continued $$C8: \|Q_k - Q_l\|^2 \le d_m^2, \forall k \in K, k \ne l,$$

$$C9: b_{m,k}(R_{k,m}) \le R_k^{max}, \forall m \in M, \forall k \in K,$$

$$C10: c_{m,k}, a_{k,s}, b_{m,k}, e_{m,s} \in \{0, 1\}, \forall m \in M, \forall k \in K,$$

wherein, C1 denotes the time delay limit; $T_m$ denotes a total time delay for completing tasks requested by the ground terminal devices m; K={1, 2, . . . , K} and M={1, 2, . . . , M} denote sets of the unmanned aerial vehicles (UAV) and the ground terminal devices, respectively; $B=(b_{m,k}\in\{0,1\}: m\in M, k\in K)$ denotes a set of whether the ground terminal devices m are accessed to the unmanned aerial vehicle k; $F=(f_{k,m}: m\in M, k\in K)$ denotes a set of computing capabilities of the unmanned aerial vehicles k on the ground terminal devices m $c=(c_{m,k}\in\{0,1\}: m\in M, k\in K)$ denotes a set of whether the computing tasks of the ground terminal devices m are offloaded to the unmanned aerial vehicles; $Q=(Q_k: k\in K)$ denotes horizontal position coordinates of the unmanned aerial vehicles k; $D_m^{max}$ denotes a maximum time delay of the tasks of the ground terminal devices m, ∀ denotes any mathematical symbol; C2 denotes an user energy consumption limit, $E_m$ denotes total energy consumption of the ground terminal devices m, $E_m^{max}$ denotes maximum energy consumption of the ground terminal devices m; C3 denotes an energy consumption limit of the unmanned aerial vehicles, $E_k$ denotes total energy consumption of the unmanned aerial vehicles k, $E_k^{max}$ denotes maximum energy consumption of the unmanned aerial vehicles; C4 denotes resource limitation allocated to the unmanned aerial vehicles; $f_{k,m}$ denotes computing capabilities of the unmanned aerial vehicles k towards the ground terminal devices m; $F_k^{max}$ denotes the maximum computing capabilities of the unmanned aerial vehicles k; C5 denotes a causality constraint, namely offloading computation is performed after the ground terminal devices are accessed to the unmanned aerial vehicles; $c_{m,k}\in\{0,1\}$ denotes whether the computing tasks of the ground terminal devices m are offloaded onto the unmanned aerial vehicles, wherein 1 indicates offloading and 0 indicates not offloading; $b_{m,k}\in\{0,1\}$ denotes whether the ground terminal devices m are accessed to the unmanned aerial vehicles k, wherein 1 indicates in access, and 0 indicates not in access; C6 specifies that one ground terminal device is only capable to access to one unmanned aerial vehicle; C7 denotes a maximum number of the ground terminal devices that the unmanned aerial vehicle is capable to access, $N_k^{max}$ is a maximum number of the ground terminal devices being capable to access; C8 is a maximum distance limit between the unmanned aerial vehicles, horizontal position coordinates of the unmanned aerial vehicles k is $Q_k=(x_k, y_k)$; $Q_l$ is horizontal position coordinates of the unmanned aerial vehicles l; $d_m$ is a maximum distance between the unmanned aerial vehicles; C9 specifies that the ground terminal devices are only capable to be connected to the unmanned aerial vehicles within the maximum range of the unmanned aerial vehicles; $R_{k,m}$ is distance between the ground terminal devices m and the unmanned aerial vehicle k; $R_k^{max}$ is a maximum communication range of the unmanned aerial vehicles; C10 indicates that $C_{m,k}$, $a_{k,s}$, $b_{m,k}$, $e_{m,s}$ are binary variables; $a_{k,s}\in\{0,1\}$ indicates whether the unmanned aerial vehicles are caching services s wherein 1 indicates caching, 0 indicates no caching; $e_{m,s} \in \{0,1\}$ denotes whether the ground terminal devices m are caching services s, wherein 1 denotes caching, and 0 denotes no caching.

6. The unmanned aerial vehicle assisted task offloading and resource allocation method based on service caching according to claim 5, wherein the method for building the optimization problem of minimizing the total time delay of request tasks of all ground terminal devices comprises:

due to a covering problem of the base station, the ground terminal devices in a coverage area are not capable to directly communicate with the base station; the base station is connected to a cloud center through a wired fiber-optic link, while the unmanned aerial vehicles communicate with the base station through a wireless backhaul link; assuming that a front-end and a backhaul link operate on different frequency bands, a wireless backhaul link capacity from each unmanned aerial vehicle to the base station is $R_b$, for the front-end link, the ground terminal devices within a coverage range of each unmanned aerial vehicle adopts orthogonal frequency division multiple access, and the bandwidth is evenly distributed among a plurality of the ground terminal devices; assuming that a total bandwidth of uplink/downlink communication is B, then a bidirectional wireless communication spectrum bandwidth from the unmanned aerial vehicles k to the ground terminal devices are $B/|M_k|$, wherein $M_k$ is a total number of users served by the unmanned aerial vehicles k;

horizontal position coordinates of the unmanned aerial vehicle k is $Q_k=(x_k, y_k)$, a height is fixed, and horizontal position coordinates of the ground terminal devices m is $Q_m=(x_m, y_m)$; the distance between the ground terminal devices m and the unmanned aerial vehicles k is $R_{k,m}=\sqrt{(x_k-x_m)^2+(y_k-y_m)^2}$, a channel gain between the ground terminal devices m and the unmanned aerial vehicles k is $$h_{k,m} = \frac{h_0}{H^2 + R_{k,m}^2},$$

$h_0$ is the channel gain when a reference distance $d_0=1$, and H is a flight altitude of each unmanned aerial vehicle; assuming that bidirectional channel gains between the ground terminal devices m and the unmanned aerial vehicles k is the same, an uplink rate and a downlink rate between the ground terminal devices m and the unmanned aerial vehicles k are $r_{m,k}^{up}$ and $r_{m,k}^{down}$, respectively:

$$\begin{cases} r_{m,k}^{up} = \frac{B}{|M_k|}\log_2\left(1 + \frac{h_{k,m}p_m}{N_0}\right) \\ r_{m,k}^{down} = \frac{B}{|M_k|}\log_2\left(1 + \frac{h_{k,m}p_k}{N_0}\right) \end{cases}$$

wherein, $p_m$ is transmission power of the ground terminal devices m, $p_k$ is transmission power allocated by the unmanned aerial vehicles k to the ground terminal devices m, and $N_0$ is noise power of a receiver;

a time for local computing is $$t_m^l = \frac{C_m}{f_m},$$

and an energy consumption of the ground terminal devices for the local computing is $E_m^l=\kappa f_m^2 C_m$, wherein, κ is a coefficient that depends on a chip structure, $f_m$ is computing power of the ground terminal devices, and $C_m$ is the number of CPU cycles required for the computing tasks of the ground terminal devices;

the ground terminal devices are selectively offloaded onto the unmanned aerial vehicle for computation, and a time for task upload to the unmanned aerial vehicle is $$t_{m,k}^u = \frac{l_m}{r_{m,k}^{up}};$$

an energy consumption for the task upload is $E_{m,k}^u=p_m t_{m,k}^u$, a time for task computation is $$t_{m,k}^e = \frac{C_m}{f_{k,m}},$$

and an energy consumption for the task computation is $E_{m,k}^e=\kappa(f_{k,m})^2 C_m$; wherein, $l_m$ is a size of input data for the ground terminal devices m, $f_{k,m}$ is computing power of the unmanned aerial vehicles k on the ground terminal devices m; if maximum computing power of the unmanned aerial vehicle k is $F_k^{max}$, then $$\sum_{m=1}^{M} f_{k,m} \le F_k^{max};$$

when the local computing is selected but the ground terminal devices has not cached corresponding service, a time for the ground terminal devices to download the corresponding service from the unmanned aerial vehicles is $$t_{k,s}^{sfw} = \frac{c_s}{r_{m,k}^{down}},$$

wherein $c_s$ is a size of programs of the service s; the energy consumption of the unmanned aerial vehicle k sending service s to the ground terminal devices m is $E_{k,m,s}^{sfw}=t_{k,s}^{sfw}\cdot p_k$;

if there is no service program corresponding to the user request task in the unmanned aerial vehicles, then the corresponding service needs to be downloaded remotely through the base station, and the time for downloading the service s is $$t_{back} = \frac{c_s}{R_b};$$

if the ground terminal devices m selects local computing, a total time delay $T_{m,k}^{l}$ of local computing is:

$$T_{m,k}^{l}=e_{m,s}t_{m}^{l}+(1-e_{m,s})b_{m,k}(t_{k,s}^{sfw}+t_{m}^{l})$$

wherein, $b_{m,k}\in\{0,1\}$ is whether the ground terminal devices m is accessed to the unmanned aerial vehicle k, 1 indicates in access, and 0 indicates not in access; $e_{m,s}\in\{0,1\}$ denotes whether the ground terminal devices m are caching services s, 1 indicates caching, 0 indicates no caching;

the total energy consumption $E_{m,k}^{l}$ for the local computing on the ground terminal devices m for the tasks is:

$$E_{m,k}^{l}=e_{m,s}E_{m}^{l}+(1-e_{m,s})b_{k,m}(E_{m}^{l}+E_{k,m,s}^{sfw})$$

the total time $T_{m,k}^{e,l}$ for the computing tasks of the ground terminal devices m to be executed on the unmanned aerial vehicle k is:

$$T_{m,k}^{e,l}=(1-e_{m,s})b_{k,m}(1-a_{k,s})(t_{back}+t_{k,s}^{sfw})$$

wherein, $a_{k,s}\in\{0, 1\}$ indicates whether the unmanned aerial vehicles k are caching services, 1 indicates caching, and 0 indicates no caching;

the total energy consumption $E_{m,k}^{e,l}$ of the computing tasks of the ground terminal devices m executed on the unmanned aerial vehicles k is:

$$E_{m,k}^{e,l}=(1-e_{m,s})b_{k,m}E_{k,m,s}^{sfw}$$

if the ground terminal devices m selects computation offloading, the computing time $T_{m,k}^{e,uav}$ of the computing tasks of the ground terminal devices m on the unmanned aerial vehicles k is:

$$T_{m,k}^{e,uav}=b_{k,m}[t_{m,k}^{u}+t_{m,k}^{u}+t_{m,k}^{e}+(1-a_{k,s})t_{back}]$$

the energy consumption $E_{m,k}^{e,uav}$ of the ground terminal devices m for computing tasks on the unmanned aerial vehicles k is:

$$E_{m,k}^{e,uav}=b_{k,m}E_{m,k}^{e}$$

wherein, $c_{m,k}\in\{0,1\}$ indicates whether the computing tasks of the ground terminal devices m are offloaded to the unmanned aerial vehicles;

the total time delay $T_m$ of completing tasks requested by the ground terminal devices m $$T_m=\sum_{k=1}^{K}(1-c_{m,k})\left(T_{m,k}^{l}+T_{m,k}^{e,l}\right)+\sum_{k=1}^{K}c_{m,k}T_{m,k}^{e,uav}$$

the total energy consumption $E_m$ of the ground terminal devices m:

$$E_m=\sum_{k=1}^{K}(1-c_{m,k})E_{m,k}^{l}+\sum_{k=1}^{K}c_{m,k}E_{m,k}^{u}$$

the total energy consumption $E_k$ of the unmanned aerial vehicles k:

$$E_k=\sum_{m=1}^{M}(1-c_{m,k})E_{m,k}^{e,l}+\sum_{m=1}^{M}c_{m,k}E_{m,k}^{e,uov}.$$

7. The unmanned aerial vehicle assisted task offloading and resource allocation method based on service caching according to claim 5, wherein in step S3, utilizing a pre built optimization problem that minimizes a total time delay of request tasks of all ground terminal devices to optimize to obtain a task offloading decision, an unmanned aerial vehicle resource allocation, and an unmanned aerial vehicle trajectory, comprising S31. solving the task offloading decision problem when the resource allocation and the unmanned aerial vehicle trajectory are determined to the optimization problem P1 transformed into P1.1:

$$P1.1:\min_{C}\sum_{m=1}^{M}T_m$$

$$\text{s.t. } C1, C2, C3, C5$$

slacking binary variables $c_{m,k}$ into continuous variables $\tilde{c}_{m,k}$, namely $0\le c_{m,k}\le 1$, wherein:

$$\tilde{T}_m=\sum_{k=1}^{K}\Big\{(1-\tilde{c}_{m,k})\Big[e_{m,s}t_{m}^{l}+(1-e_{m,s})b_{m,k}a_{ks}\left(t_{k,s}^{sfw}+t_{m}^{l}\right)+(1-e_{m,s})(1-a_{k,s})b_{k,m}\left(t_{m,k}^{u}+t_{m,k}^{e}+t_{back}\right)\Big]+\tilde{c}_{m,k}b_{k,m}\left[t_{m,k}^{u}+t_{m,k}^{e}+(1-a_{k,s})t_{back}\right]\Big\}$$

$$\tilde{E}_m=\sum_{k=1}^{K}(1-\tilde{c}_{m,k})\left\{e_{m,s}E_{m}^{l}+(1-e_{m,s})\left[a_{k,s}b_{k,m}E_{m}^{l}+(1-a_{k,s})b_{k,m}E_{m,k}^{u}\right]\right\}+\sum_{k=1}^{K}\tilde{c}_{m,k}p_{m,k}t_{m,k}^{u}$$

$$\tilde{E}_k=\sum_{m=1}^{M}(1-\tilde{c}_{m,k})\left\{(1-e_{m,s})b_{k,m}\left[(1-a_{k,s})E_{m,k}^{e}+a_{k,s}E_{k,m,s}^{sfw}\right]\right\}+\sum_{m=1}^{M}\tilde{c}_{m,k}b_{k,m}E_{m,k}^{e}$$

wherein, $\tilde{T}$, $\tilde{E}_m$ and $\tilde{E}_k$ denote the total time delay of the completing tasks requested by the ground terminal devices m after slacking, the total energy consumption of the ground terminal devices m, and the total energy consumption of unmanned aerial vehicles k, respectively;

then, the optimization problem P1.1 is transformed into P1.2:

$$P1.2:\min_{B,F,C,Q}\sum_{m=1}^{M}\tilde{T}_m$$

$$\text{s.t. } \tilde{T}_m\le D_{m}^{max},\ \forall\, m\in M,$$

$$\tilde{E}_m\le E_{m}^{max},\ \forall\, m\in M,$$

$$\tilde{E}_k\le E_{k}^{max},\ \forall\, k\in K,$$

$$\tilde{c}_{m,k}\le b_{m,k},\ \forall\, m\in M,\ \forall\, k\in K,$$

the optimization problem P1.2 is a linear programming problem with linear constraints, therefore, the optimization problem P1.2 is a convex problem, and using CVX in the MATLAB toolbox to solve to obtain an optimal solution $C_{m,k}$;

S32. in the case that the task offloading decision and the unmanned aerial vehicle trajectory are determined, solving the unmanned aerial vehicle resource allocation problem, based on this, the optimization problem P1 is transformed into P1.3:

$$P1.3: \min_{F} \sum_{m=1}^{M} T_m$$
$$\text{s.t. } C1: T_m \le D_m^{max}, \forall\, m \in M,$$
$$C3: E_k \le E_k^{max}, \forall\, k \in K,$$
$$C4: \sum_{m=1}^{M} f_{k,m} \le F_k^{max}, \forall\, m \in M, \forall\, k \in K,$$

using Lagrangian constraint condition and KKT constraint condition to solve, two constraint factors $\lambda_m$, $v_m$ are introduced, $\lambda_m>0$, $v_m>0$, and the Lagrangian formula is defined as:

$$L(f_{k,m}, \lambda_m, v_m) = \sum_{m=1}^{M} T_m + \sum_{m=1}^{M} \lambda_m\left(\kappa(f_{k,m})^2 C_m - E_k^{max}\right) + \sum_{m=1}^{M} v_m(f_{k,m} - F_k^{max})$$

since the optimization problem P1.3 is a convex problem, by applying the KKT condition, $$\frac{\partial(L(f_{k,m}\lambda_m, v_m))}{\partial f_{k,m}} = 0$$

is obtained, and $$\lambda_m\left(\sum_{m=1}^{M} \kappa(f_{k,m})^2 C_m - E_k^{max}\right) = 0,\ v_m\left(\sum_{m=1}^{M} f_{k,m} - F_k^{max}\right) = 0;$$

solving to obtain an optimal unmanned aerial vehicle resource allocations $f_{k,m}^*$:

$$f_{k,m}^* = \sqrt{\frac{E_k^{max}}{\kappa C_m}};$$

S33. in the case that the task offloading decision and the unmanned aerial vehicle resource allocation are determined, solving the unmanned aerial vehicle trajectory problem, the optimization problem P1 is transformed into the optimization problem P1.4:

$$P1.4: \min_{Q} \sum_{m=1}^{M} T_m$$
$$\text{s.t. } C1: T_m \le D_m^{max}, \forall\, m \in M,$$
$$C2: E_m \le E_m^{max}, \forall\, m \in M,$$
$$C3: E_k \le E_k^{max}, \forall\, k \in K,$$
$$C8: \|Q_k - Q_l\|^2 \le d_m^2, \forall\, k \in K, k \ne l,$$

the transmission time delay of the ground terminal devices in the objective function, the energy consumption of the unmanned aerial vehicle multicast software in the constraint, and the energy consumption of task upload are non convex, but for variable $Q_k$, the formula $\|Q_k-Q_l\|^2$ is convex, thus, the continuous convex approximation method is applied; because the first-order Taylor expansion at any point of any convex function is a global lower bound of the convex function, the convex function is approximated by the first-order Taylor expansion; the transmission rate $r_{m,k}^{up}$ from the ground terminal devices to the unmanned aerial vehicles is approximately:

$$r_{m,k}^{up} = \frac{B}{|M_k|}\log_2\left(1 + \frac{h_{k,m}p_m}{N_0}\right) \ge \frac{B}{|M_k|}\log_2(1 + \frac{h_0 p_m}{(H^2 + \|Q_k[i] - Q_l\|^2)N_0} - Z_{m,k}[i](\|Q_k - Q_l\|^2 - \|Q_k[i] - Q_l\|^2) = r_{k,m}^{lb}$$

wherein, $$Z_{m,k}[i] = \frac{G_{m,k}\log_2 e}{\left(G_{m,k} + H^2 + \|Q_k[i] - Q_m\|^2\right)\left(H^2 + \|Q_k[i] - Q_m\|^2\right)},$$
$$G_{m,k} = \frac{h_0 p_{k,m}}{N_0};$$

wherein, $Q_k[i]$ is the i-th Taylor expansion for the unmanned aerial vehicle trajectory, $Z_{m,k}$ [i] and $G_{m,k}$ are intermediate parameters; when introducing intermediate parameters $r_{k,m}^{lb}$ into the optimization problem P1.4, P1.4 is a standard convex optimization problem, using CVX in the MATLAB toolbox to solve to obtain an optimal solution $Q_k$;

S34. through iterative solving the three sub-problems P1.2, P1.3, and P1.4, and updating the corresponding solutions to obtain the solution for P1: task offloading decision, the unmanned aerial vehicle resource allocation, and the unmanned aerial vehicle trajectory.

8. An unmanned aerial vehicle assisted task offloading and resource allocation device based on service caching, comprising a processor and a storage medium;

the storage medium is configured to store instructions; and the processor is configured to operate according to the instructions to execute the method according to claim 1.

9. An electronic device, comprising:

a memory;

a processor;

and a computer program;

wherein, the computer program is stored in the memory and configured to be executed by the processor to implement the method according to claim 1.

10. A non-transitory storage medium, wherein a computer program is stored on the storage medium, and the method according to claim 1 is implemented when the computer program is executed by a processor.

* * * * *